(12) United States Patent
Fidler

(10) Patent No.: US 7,054,962 B2
(45) Date of Patent: May 30, 2006

(54) EMBEDDED SYSTEM HAVING BROADCAST DATA STORING CONTROLLER

(75) Inventor: Mark W. Fidler, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 150 days.

(21) Appl. No.: 10/094,254

(22) Filed: Mar. 8, 2002

(65) Prior Publication Data

US 2003/0172208 A1    Sep. 11, 2003

(51) Int. Cl.
    *G06F 3/00*    (2006.01)
(52) U.S. Cl. ............................. 710/52; 710/57
(58) Field of Classification Search .............. 710/52, 710/56–60; 370/390
    See application file for complete search history.

(56) References Cited

U.S. PATENT DOCUMENTS

| | | | |
|---|---|---|---|
| 4,912,703 A * | 3/1990 | Sumida ...................... 370/235 |
| 5,410,540 A * | 4/1995 | Aiki et al. .................. 370/390 |
| 5,636,345 A | 6/1997 | Valdevit |
| 5,793,978 A | 8/1998 | Fowler |
| 5,818,838 A * | 10/1998 | Backes et al. .............. 370/390 |
| 5,898,687 A * | 4/1999 | Harriman et al. ........... 370/390 |
| 6,185,206 B1 * | 2/2001 | Nichols et al. ............. 370/390 |
| 6,185,223 B1 * | 2/2001 | Meyer et al. ............... 370/429 |
| 6,310,875 B1 * | 10/2001 | Nichols et al. ............. 370/388 |
| 6,493,315 B1 * | 12/2002 | Simpson et al. ............ 370/229 |
| 6,754,211 B1 * | 6/2004 | Brown ...................... 370/389 |
| 2002/0075871 A1 * | 6/2002 | Blanc et al. ................ 370/390 |

FOREIGN PATENT DOCUMENTS

| | | |
|---|---|---|
| EP | 0 847 168 | 6/1998 |
| WO | 02/23816 | 3/2002 |

* cited by examiner

*Primary Examiner*—Tammara Peyton
*Assistant Examiner*—David Martinez

(57) ABSTRACT

An embedded system for receiving data packets from a communication network includes a plurality of buffers for storing data received from the communication network, and a pointer corresponding to each of the buffers. The embedded system also includes a device for determining whether data received from the communication network is a broadcast data, and a data controller for storing broadcast data in a predetermined number of buffers.

16 Claims, 4 Drawing Sheets

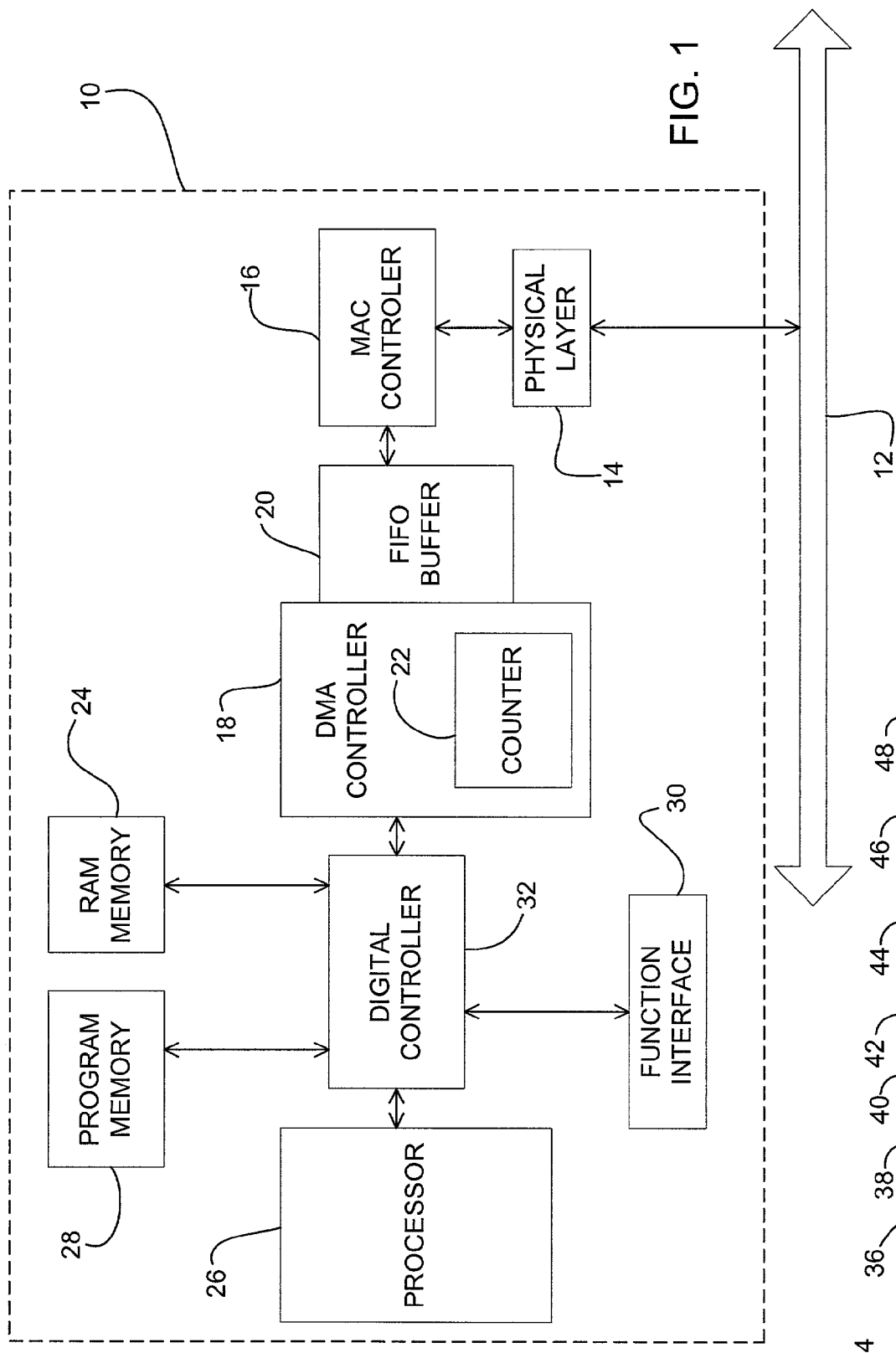

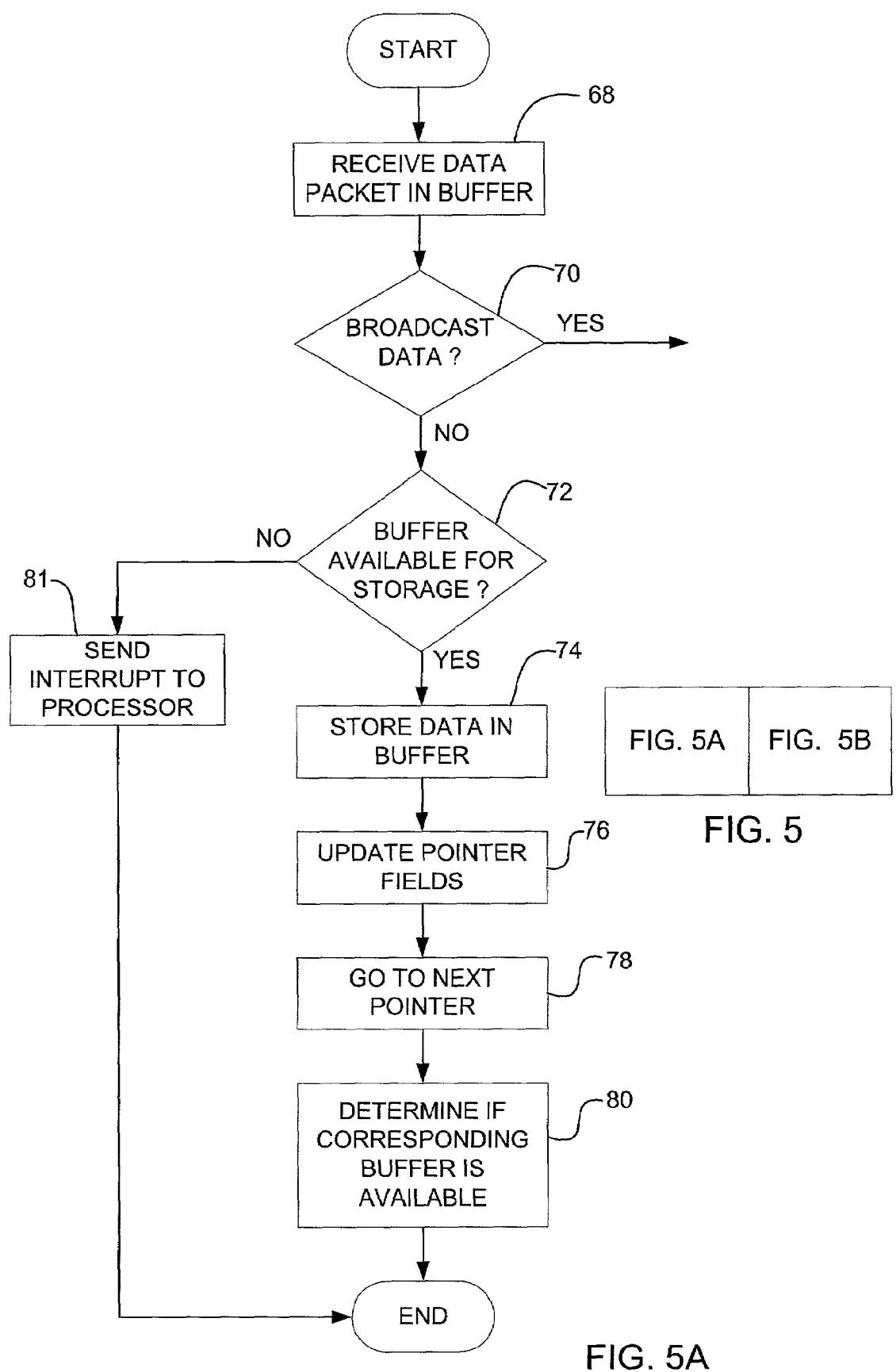

EMBEDDED SYSTEM HAVING BROADCAST DATA STORING CONTROLLER

The present invention generally relates to network devices, and more particularly to an embedded system in a communication network for limiting broadcast data that are stored in the memory of the embedded system.

BACKGROUND

Computing systems with constrained resources are becoming very common in environments in which communications with one or more other devices are required. Frequently, these systems are referred to as embedded systems. They are typically limited in functionality, and have fewer resources than a typical personal computer, i.e., limited processing capability, memory size and speed of internal bus structures, for example.

In a communication network environment, the embedded systems typically have a single processor and a memory for the processing of network data as well as the specific functions that they perform. A print server in a local area network (LAN) is an example of an embedded system in a network. Generally, data coming in from the network can be lumped into two categories, broadcast and non-broadcast. Non-broadcast data is characterized as being sent to a particular node where an embedded system is logically located. Broadcast data, on the other hand, refers to data sent to a group of nodes or all nodes on the network.

As more and more nodes are added to the network, broadcast data traffic increases, thus making it difficult for the embedded systems to receive and process the increased data flow from the network, particularly the non-broadcast data necessary for performing the particular functions of the embedded systems. The processors in the embedded systems typically do not have the bandwidth to process the incoming data fast enough and/or adequate memory (buffer structures) to store all the incoming data.

One treatment of this problem in the past has been to simply hope that the amount of broadcast data does not exceed the capacity of the processor. This has proven inadequate in networks with high surge of broadcast traffic or during "broadcast storms." Another known attempt to solve the problem of high broadcast traffic involves disabling the embedded system's capability to receive broadcast data. This, however, cannot be done dynamically and the embedded system typically must be reset. Also, in most off-the-shelf embedded systems, this method results in loss of current network state, such as connection to the network.

SUMMARY OF THE INVENTION

The present invention is directed to an embedded system for receiving data packets from a communication network. The system includes a plurality of buffers for storing data received from the communication network, and a pointer corresponding to each of the buffers. The embedded system also includes a device for determining whether data received from the communication network is broadcast data, and a data controller for storing broadcast data in a predetermined number of buffers.

DESCRIPTION OF THE DRAWINGS

FIG. 1 is block diagram of an embedded system in accordance with an embodiment of the present invention;

FIG. 2 is a type of data packet that is received by the embedded system of FIG. 1;

FIG. 5 is an arrangement of FIGS. 5A and 5B; and,

FIGS. 5A and 5B are flowcharts illustrating a process in which data are stored in the memory of FIG. 3 by a DMA controller shown in FIG. 1.

DETAILED DESCRIPTION OF THE INVENTION

Figure 3:
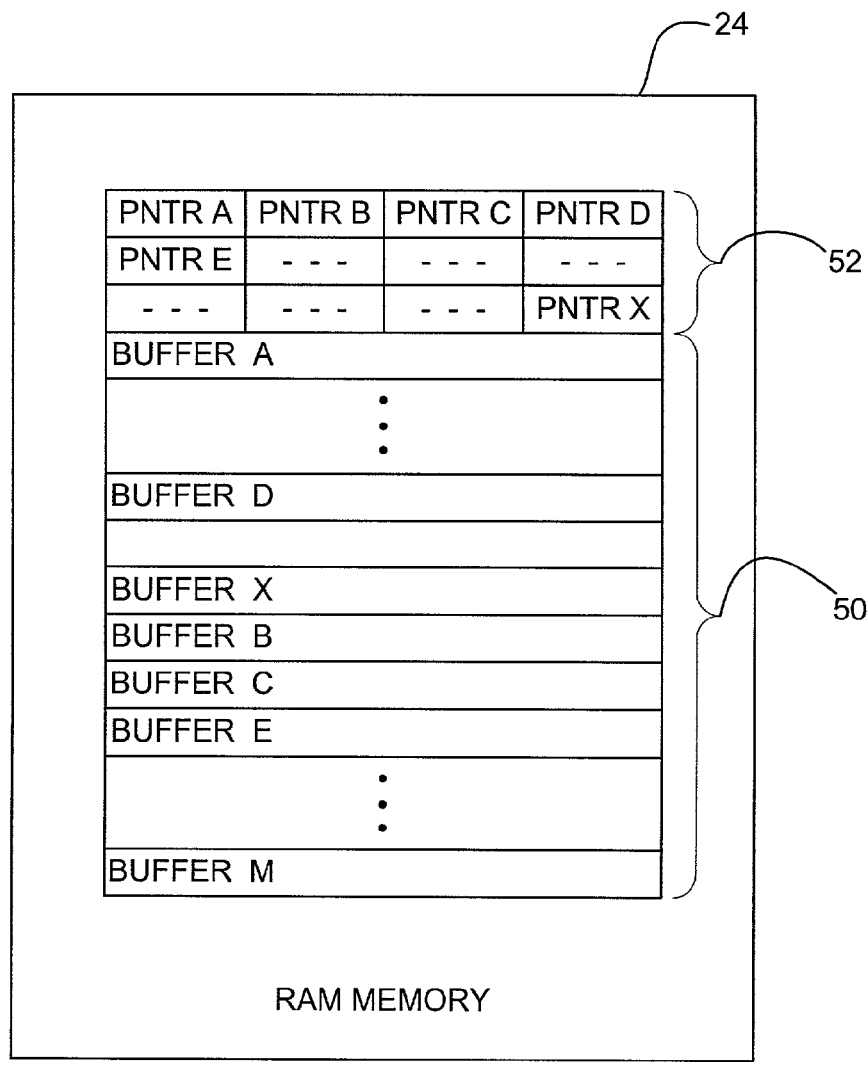
FIG. 3 is a block diagram of a memory of the embedded system of FIG. 1, including buffers and corresponding pointers.

Turning now to FIG. 1, the embedded system in accordance with an embodiment of the present invention is indicated generally at 10, and is adapted to be connected to a communication network 12, which includes a combination of function media (such as the embedded system 10), infrastructure and other computing devices. The network 12, such as a local area network (LAN), a wide area network (WAN) or a personal area network (PAN), allows information to be generated and shared across the media. The embedded system 10 includes a physical layer 14 for encoding and decoding data transmitted to and received from the network 12 in various known methods. A media access controller (MAC) 16 is connected to the physical layer 14 and is responsible for controlling access between the embedded system 10 and the network 12, error checking and address filtering of data from the network. In accordance with the invention, the MAC 16 is also adapted to determine whether the incoming data is broadcast data or non-broadcast data. The MAC 16 also includes an address or a group of addresses, which is unique to this node or address of the embedded system 10, and filters out non-broadcast data that is not intended for the node of the embedded system.

The embedded system 10 also includes a direct memory access (DMA) controller 18 for controlling transfer of data between the memory of the embedded system and the network 12. A first in first out (FIFO) buffer 20 is provided between the DMA controller 18 and the MAC 16 for limited storage of incoming data from and outgoing data to the network 12. The DMA controller 18 includes a counter 22 for keeping track of the number of pieces of broadcast data that are eligible to be stored in a system memory 24, which in the preferred embodiment is a random access memory (RAM).

Data from the network 12 is stored in the RAM memory 24 where it is accessible to a processor 26. Data from the processor 26 that is intended to be sent (transmitted) to the network 12 is also stored in the RAM memory 24 prior to being read by the DMA controller 18. The processor 26 is responsible for executing instructions that control the functions of the embedded system 10. Preferably, the instructions for the processor 26 are provided in a firmware stored in a program memory 28. The embedded system 10 also includes a function interface 30 for operatively connecting the embedded system 10 to other control systems, e.g., printing, scanning and communication interfaces to other network links such as LAN, WAN, etc. A digital controller 32 provides the means necessary for the various components (i.e., the DMA controller 18, the RAM memory 24, the processor 26, the program memory 28 and the function interface 30) of the embedded system 10 to operatively communicate with each other.

Referring to FIG. 2, data in the network 12, either broadcast or non-broadcast, is transmitted in a packet form. A data packet 34 includes predefined fields that provide pertinent information required by the network 12. The information contained in the data packet 34 is driven by the standard associated with the network 12 to which the embedded system 10 is interfaced. Examples of the standard include Ethernet, IEEE 802.11, IEEE 802.3, IEEE 802.4, IEEE 802.5 and BLUETOOTH. The packet includes a start delimiter (SD) field 36 for indicating the beginning of the packet 34, and a destination address (DA) field 38 for indicating the intended recipient of the packet. The DA field 38 also indicates whether or not the packet 34 contains broadcast data, preferably by a special bit. It should be understood, however, that other fields within the packet 34 may also indicate whether the data that it is carrying is a broadcast or non-broadcast and through other means besides a special bit.

A source address (SA) field 40 provides the identification of the node from which the data packet 34 originated, a control field (CF) 42 describes the type of packet being sent, and often the length of the packet, and a data field 44 stores the data, either broadcast or non-broadcast, intended for the destination(s) of the packet 34. A cyclic redundancy checksum (CRC) field 46 provides information for determining whether an error has occurred in the data in the field 44 during transmission, and an end delimiter (ED) field 48 indicates the end point of the data packet 34.

In operation, the data packet 34 from the network 12 is received by the MAC controller 16 after it has been appropriately processed (i.e., decoded) by the physical layer 14. The MAC controller 16 determines whether the packet contains broadcast data, usually from the DA field 38. The data contained in the data field 44 of the packet 34 is then forwarded to the FIFO buffer 20 along with an indication as to whether the received data is broadcast data or non-broadcast data. Based on this information, the DMA controller 18 writes the data received in the data packet 34 to the next available buffer in the RAM memory 24, which includes a predetermined number of buffers 50 (shown in FIG. 3) intended for both broadcast data and non-broadcast data.

More specifically, the broadcast data counter 22 keeps track of a predetermined number of broadcast data packets 34 which may be received. This number is decremented by one each time broadcast data contained in a data packet 34 is stored in these buffers 50. The DMA controller 18 will continue to write broadcast data to the buffers 50 of the RAM 24 until the counter 22 has been decremented to zero. When this point has been reached, the DMA controller 18 stops writing broadcast data to the RAM memory 24 until the processor 26 determines that the memory has space for more broadcast data. At this time the processor increments the counter 22 to a non-zero number, and makes the buffers 50 available for storing additional broadcast data, thereby allowing the DMA controller 18 to write new broadcast data into those buffers. In the preferred embodiment, the counter 22 is incorporated into the hardware of the DMA controller 18. However, those of ordinary skill in the art will understand that the counter 22 can also be implemented as a separate hardware, or even in a combination of hardware and firmware, for example.

When the DMA controller 18 receives a non-broadcast data, it is written to the next available buffer 50, without regard for the broadcast data counter 22. In the preferred embodiment, the processor 26 gives priority to the process of non-broadcast data, and processes broadcast data only after the non-broadcast data has been processed. Other processing orders, however, should be recognizable by those skilled in the art.

Figure 4:
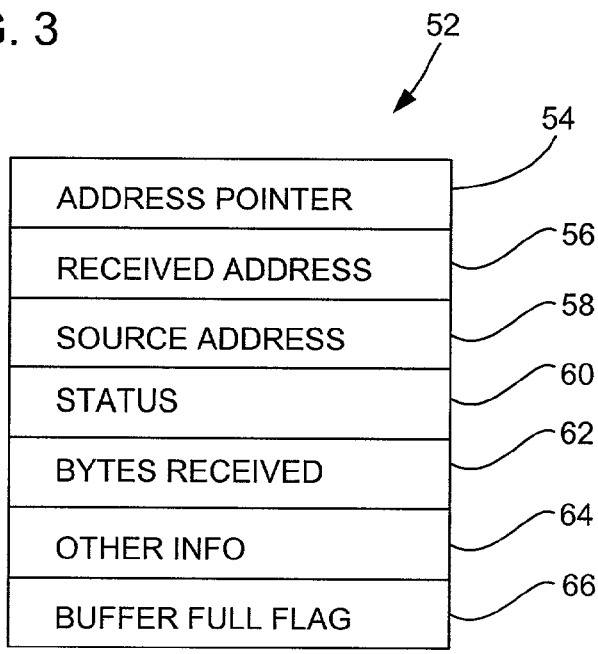
FIG. 4 is a simplified diagram showing various fields in the pointers in the memory of FIG. 3.

Turning now to FIGS. 3 and 4, the RAM memory 24 includes a plurality of the buffers 50. In the preferred embodiment, each buffer 50 stores data carried in a single data packet 34. Two or more buffers 50 may store data contained in a single data packet 34, however, if necessary, as those skilled in the art will recognize. A number which determines how many buffers are eligible to store broadcast data is chosen by the embedded system 10 designer. The RAM memory 24 also includes a corresponding pointer 52 for each buffer 50. Each pointer 52 (best shown in FIG. 4) includes an address pointer field 54 identifying its corresponding buffer 50, a received address field 56 identifying the destination address of the data carried in the data packet 34. A source address field 58 indicates the address from where the data originated. A status field 60 indicates whether the data stored in the corresponding buffer 50 is a broadcast data or not. This field 60 can also be used for flagging errors, such as collision, CRC error, etc. A field 62 indicates the number of bytes of data stored in the corresponding buffer 50, and a field 64 is used for other information that may be of use to the embedded system designer, for example, storing network transport checksum. A field 66 includes a flag indicating whether the corresponding buffer 50 is storing data.

Figure 5B:
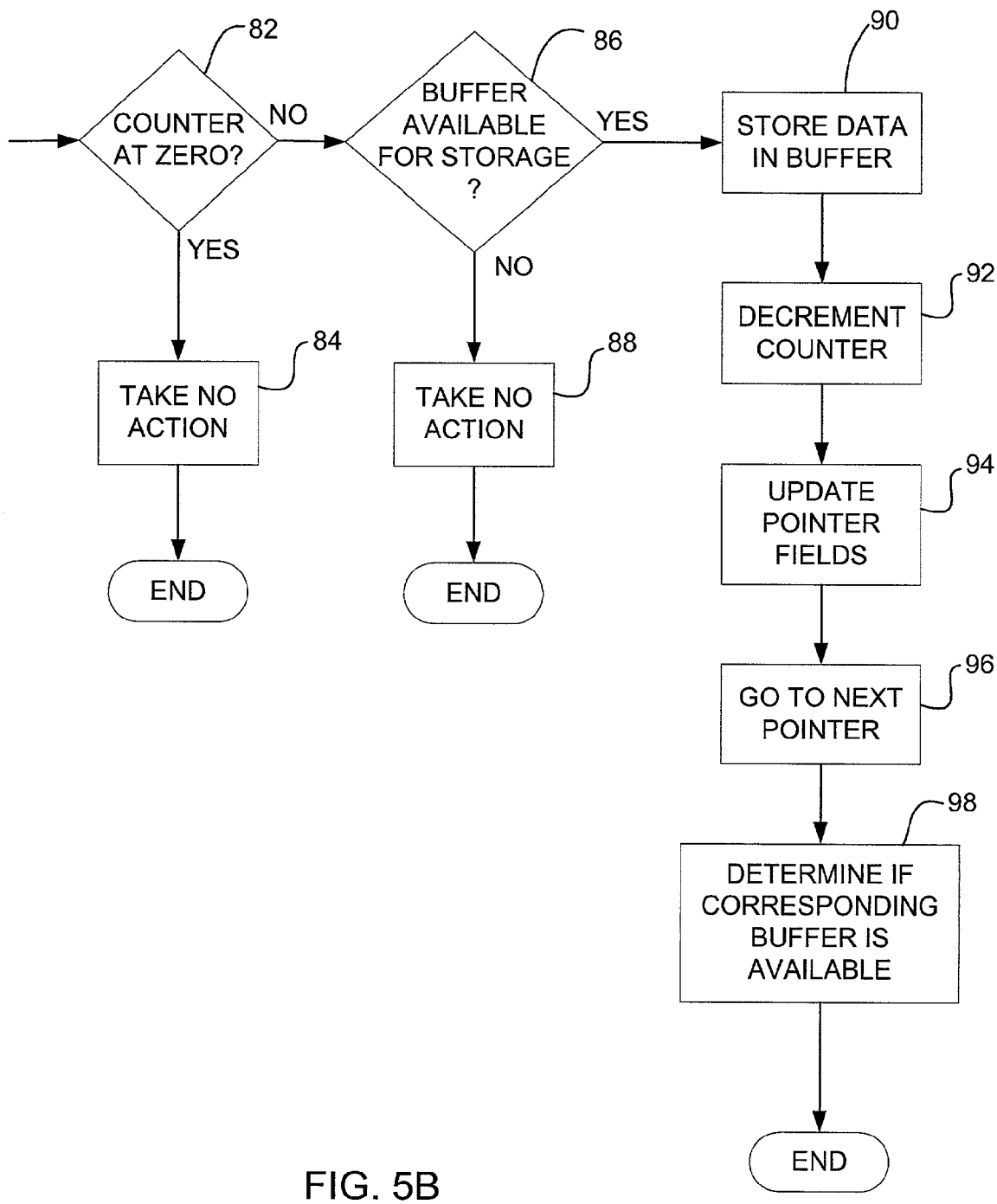

Turning now to FIGS. 5A and 5B, the process that occurs between the DMA controller 18 and the RAM memory 24 is described in more detail. When data carried in the packet 34 is received in the FIFO buffer 20 (block 68), the DMA controller 18 first determines whether the data in the packet 34 is broadcast data or non-broadcast data (block 70). If the data received is non-broadcast, the DMA controller 18 refers to the pointer 52 corresponding to the next available buffer 50 for the location of the buffer and stores the data in that buffer in the RAM memory 24 (block 74), if a buffer is available at block 72. Then, all the fields in the corresponding pointer 52 are updated by the processor 26 to reflect the information relating to the newly stored data (block 76). The DMA controller 18 then checks the next pointer 52 (block 78), and determines if its corresponding buffer 50 is available to store data (block 80). The DMA controller 18 checks the field 66 for a buffer full flag for this purpose.

Referring back to block 72, if no buffer 50 in the RAM memory 24 is available for storing data, the DMA controller 18 sends an interrupt to the processor 26 (block 81). In the preferred embodiment, the pointers 52 are accessed by the DMA controller 18 in a sequential order, and the data in the buffers 50 are processed by the processor 26 in that same order. Accordingly, once the last pointer 52 or buffer 50 in the RAM memory 24 has been accessed or processed, the first pointer and buffer become the next pointer and buffer.

If the data received is a broadcast data (at block 70), the DMA controller 18 checks the broadcast data counter 22 to see if the count is at zero (block 82), indicating that the predetermined number has been reached for storing broadcast data in the RAM memory 24. If the count is at zero, no action is taken with respect to the received broadcast data (block 84). In other words, the data does not get stored in the RAM memory 24. If the counter 22 is not at zero, but no buffer 50 in the RAM memory 24 is available for storing the data (block 86), no action is taken with respect to the broadcast data in the packet 34 (block 88).

If, however, a buffer 50 is available (block 86), the DMA controller 18 refers to the pointer 52 corresponding to the available buffer 50 for the location of that buffer, stores the broadcast data in the buffer (block 90), and decrements the counter 22 by one (block 92). Then, the fields in the corresponding pointer 52 described above are updated by the processor 26 to reflect the information relating to the newly stored broadcast data (block 92). The DMA controller 18 then checks the next pointer (block 96) and determines if its corresponding buffer 50 is available to receive data (block 98), i.e., checks the buffer full flag in the field 66.

From the foregoing description, it should be understood that an improved embedded system has been shown and described which has many desirable attributes and advantages. The embedded system includes a DMA controller having a counter that keeps track of number of broadcast data stored in the memory so that they do not exceed the predetermined number, thereby leaving sufficient amount of buffers in the memory for storage of non-broadcast data.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. An embedded system for receiving data packets from a communication network, said embedded system comprising:
   a plurality of buffers for storing data received from the communication network, and a pointer corresponding to each of said buffers;
   means for determining whether data received from the communication network is broadcast data or non-broadcast data prior to being stored in said plurality of buffers; and,
   a data controller for storing non-broadcast data in a first predetermined number of said plurality of buffers, and for storing broadcast data received from the communication network in a second predetermined number of said plurality of buffers;
   wherein said data controller stores non-broadcast data in said second predetermined number of said plurality of buffers when non-broadcast data received from the communication network exceeds said first predetermined number of said plurality of buffers, and stops storing broadcast data received from the communication network in said second predetermined number of said plurality of buffers when each of said second predetermined number of said plurality of buffers stores broadcast data or non-broadcast data.

2. The system as defined in claim 1 wherein each of said buffers stores data contained in one data packet.

3. The system as defined in claim 1 wherein each of said pointers includes a field for indicating whether data stored in a corresponding one of said buffers is broadcast data, and a field for indicating whether said corresponding buffer is full.

4. The system as defined in claim 1 wherein said data controller includes a counter which decrements from a number corresponding to said second predetermined number of said buffers each time broadcast data is stored in said second predetermined number of said buffers.

5. The system as defined in claim 4, wherein said data controller stops storing broadcast data in said second predetermined number of said plurality of buffers when said corresponding number decrements to zero.

6. The system as defined in claim 4 further including a processor for processing said broadcast data in said plurality of buffers, and causing said counter to increment said decremented corresponding number each time said broadcast data in one of said buffers has been processed.

7. The system as defined in claim 6 wherein said processor causes said counter to increment said decremented corresponding number in accordance with instructions stored in a firmware provided in said embedded system.

8. The system as defined in claim 1 further including:
   a processor for processing data stored in said buffers;
   a program memory for storing operating instructions for said processor; and,
   a system controller for providing communication between said processor, said program memory, said buffers and said data controller.

9. The system as defined in claim 8 further including:
   a physical layer interconnected between said determining means and the communication network for encoding and decoding data transmitted to and received from the communication network; and,
   a controller buffer operatively provided between said determining means and said system controller for holding data received from the network via said determining means.

10. The system as defined in claim 8 further including a function interface connected to said system controller for operatively connecting said embedded system to a network medium.

11. A method of controlling an amount of broadcast data, carried in data packets from a communication network, that are stored in a memory of a network device, said method comprising the steps of:
    determining whether the data packets received from the communication network carries broadcast data or non-broadcast data prior to being stored in the buffers;
    storing non-broadcast data in a first predetermined number of the buffers;
    storing broadcast data received from the communication network in a second predetermined number of the buffers;
    storing non-broadcast data in said second predetermined number of the buffers when non-broadcast data received from the communication network exceeds said first predetermined number of the buffers; and,
    stopping storage of broadcast data received from the communication network in said second predetermined number of buffers when each of the second predetermined number of buffers stores broadcast data or non-broadcast data.

12. The method as defined in claim 11 further including decrementing a number corresponding to said second predetermined number of the buffers each time broadcast data is stored in said second predetermined number of the buffers.

13. The method as defined in claim 12 further including the step of incrementing said decremented corresponding number each time one of said second predetermined number of buffers is made available to receive broadcast data.

14. The method as defined in claim 13 further including the step of providing a pointer corresponding to each of said buffers, wherein said each of said pointers indicates whether data stored in corresponding one of said buffers is broadcast data.

15. A function device in a communication network for receiving data packets, said device comprising:

a plurality of buffers for storing data in the data packets received from the communication network and a pointer corresponding to each of said buffers;

means for determining whether the data packets received from the communication network is broadcast data or non-broadcast data prior to being stored in said plurality of buffers;

a data controller for storing non-broadcast data in a first predetermined number of said plurality of buffers and, and for storing broadcast data in a second predetermined number of said plurality of buffers, wherein said data controller stores non-broadcast data in said second predetermined number of said plurality of buffers when non-broadcast data received from the communication network exceeds said first predetermined number of said plurality of buffers, and stops storing broadcast data received from the communication network in said second predetermined number of said plurality of buffers when each of said second predetermined number of said plurality of buffers stores broadcast data or non-broadcast data;

a counter which decrements a number corresponding to said second predetermined number of said plurality of buffers each time said broadcast data is stored in said buffers; and, a processor for processing data stored in said buffers.

16. The system as defined in claim 15 wherein said counter increments said decremented corresponding number each time a buffer is made available to receive broadcast data.

* * * * *

UNITED STATES PATENT AND TRADEMARK OFFICE
CERTIFICATE OF CORRECTION

PATENT NO. : 7,054,962 B2 Page 1 of 1
APPLICATION NO. : 10/094254
DATED : May 30, 2006
INVENTOR(S) : Mark W. Fidler It is certified that error appears in the above-identified patent and that said Letters Patent is hereby corrected as shown below:

In column 7, line 9, in Claim 15, after "buffers" delete "and".

Signed and Sealed this

Twenty-sixth Day of May, 2009

JOHN DOLL
*Acting Director of the United States Patent and Trademark Office*